United States Patent [19]

Sugitani

[11] Patent Number: 5,411,804

[45] Date of Patent: May 2, 1995

[54] WATER-DISPERSIBLE, HEAT-RESISTANT COMPOSITION AND USE THEREOF

[75] Inventor: Nobuhiro Sugitani, Tokyo, Japan

[73] Assignee: Sugianikinzokukogyo Co. Ltd., Tokyo, Japan

[21] Appl. No.: 101,907

[22] Filed: Aug. 4, 1993

Related U.S. Application Data

[62] Division of Ser. No. 635,505, Aug. 7, 1991, abandoned.

[51] Int. Cl.$^6$ ............ B22C 9/06; B22C 3/00; D21H 13/46; B32B 18/00
[52] U.S. Cl. ............ 428/404; 428/408; 428/688; 428/921; 428/376.1; 428/376.2; 428/379; 428/381; 428/397.8; 428/402; 428/404; 428/419.1; 428/419.6; 264/212; 264/213; 264/221; 264/86; 501/53; 501/54; 501/55; 501/152
[58] Field of Search ............ 427/376.1, 376.2, 379, 427/381, 397.8, 402, 404, 419.1, 419.6; 264/221, 212, 213, 86; 428/404, 408, 688, 921; 501/152, 53, 54, 55

[56] References Cited

FOREIGN PATENT DOCUMENTS 048358 of 1988 Japan .

*Primary Examiner*—Patrick J. Ryan
*Assistant Examiner*—Richard P. Weisberger
*Attorney, Agent, or Firm*—Kane, Dalsimer, Sullivan, Kurucz, Levy, Eisele and Richard

[57] ABSTRACT

The present invention relates to a heat resistant composition which exhibits excellent heat and wear resistances after being cured. Further, it has excellent releaseability and durability, and the cured film thereof has a more excellent stability than a prior art adhesive of this type, by preparing it from two components: a powder mixture consisting of 20% by weight or more of zirconium oxide, 1 to 10% by weight of sodium titanate, 2 to 15% by weight of yttria based on the zirconium oxide and the balance of silica; and a sodium silicate containing a small amount of water added thereto.

6 Claims, No Drawings

WATER-DISPERSIBLE, HEAT-RESISTANT COMPOSITION AND USE THEREOF

This application is a division of application Ser. No. 07/635,505, filed Aug. 7, 1991, now abandoned, which was a national type application of PCT/JP90/00203.

TECHNICAL FIELD

The present invention relates to adhesive and coating compositions which exhibit excellent thermal shock resistance, durability and wear resistance after being cured, the use thereof, and a coating material for a casting mold, comprising an aqueous dispersion containing a heat resistant fiber material therein, as well as a sheet made of the coating composition and the heat resistant fiber.

BACKGROUND TECHNIQUE

In recent years, adhesives essentially comprising inorganic ingredients have been studied. For Example, Japanese Patent Publication 33510/75 discloses a process for producing a highly heat-resistant adhesive composition, comprising calcining a mixture of a particulate high-purity zirconium oxide and colloidal silicic acid as well as sodium aluminate in an amount of 2 to 10% by weight of the total amount of the zirconium oxide and the silicic acid at 1,000° C. or more and finely pulverizing the calcined material. It was reported that the adhesive produced in this process has a lower curing temperature in a range of 250° to 350° C.

The present inventors has succeeded in significantly improving the life of a mold by affixing or applying a heat resistant fiber such as potassium titanate ($K_2Ti_6O_{13}$) fiber, polytitanocarboxyl silane fiber and carbon fiber onto an inner surface of the mold by use of such inorganic adhesive composition (see Japanese Patent Application Nos. 313755/88 and 323607/88 (Laid Open Publication No. 169150/91). They have also provided a heat resistant sheet using the above-described adhesive composition (see Japanese Patent Application No.13308/89).

However, the present inventors have understood that the above-described adhesive composition has a problem in its stability after being cured, and the cured coating film is liable to be relatively peeled off. Thereupon, as a result of repeated studies to improve the stability, it has been found that the addition of yttria provides an adhesive film (or coating film) which exhibits a more excellent stability than the adhesive described in Japanese Patent Publication 33510/75 and has significant excellent wear resistance, peel-off stability and thermal shock resistance after being dried.

DISCLOSURE OF THE INVENTION

The present inventors has found that the above drawback can be solved by providing, as the adhesive and coating compositions, a water-dispersible, heat-resistant composition comprising: a powder mixture consisting of by weight or more of zirconium oxide, 1 to 10% by weight of sodium alminate, yttria in an amount of 2 to 15% by weight, preferably 4 to 10% by weight based on the zirconium oxide, and the balance of silica: and sodium silicate containing a small amount of water added thereto.

BEST MODE FOR CARRYING OUT THE INVENTION

The heat resistant composition of the present invention is prepared by adding sodium silicate containing a small amount of water added thereto to a powder mixture consisting of 20% or more, preferably 25 to 70% by weight of zirconium oxide, 1 to 10%, preferably 2 to 5% by weight of sodium aluminate, 2 to 15%, preferably 4 to 10% by weight of yttria based on the zirconium oxide and the balance of silica, in an amount of 40 to 50 parts by weight (based on 100 parts by weight of the powder mixture). If the yttria content is less than 2% by weight based on the zirconium oxide, a sufficient stabilizing effect is not achieved. If the yttria content is more than 15% by weight based on the zirconium oxide, an additional effect cannot be expected and hence, the use of yttria in an excessive amount is uneconomic from the viewpoint that yttria is expensive. Any content of zirconium oxide less than 20% by weight will result in an insufficient adhesive force and in an insufficient gradient-providing function between the ceramic layer and a substrate (e.g., a base metal). Optionally, the composition may further contain a heat resistant pigment, e.g., inorganic pigments such as iron oxides, titanium dioxide, which will have no adverse affection during curing or after curing. The composition will exhibit a heat resistance at 1,300° C. after being cured.

In the composition of the present invention, a ruggedness may be produced in a coating film thereof due to sudden evaporation of water and therefore, in order to avoid this, the composition may be air-dried or dried at a temperature of up to about 90° C. for 20 minutes to 3 hours. It is convenient that the curing is conducted at about 200° to about 350° C. for 20 minutes to 3 hours. At a higher temperature, there is an adverse affection due to the remaining water upon the surface of the coating film. At a lower temperature, a satisfactory curing is impossible.

Therefore, the present invention is also directed to a method of use of a heat resistant composition of the type described above, comprising applying the composition onto a substrate, and removing water at a temperature in a range of room temperature to 90° C. after overlapping the substrate on a mating member when the composition is used as an adhesive composition, and effecting a curing reaction at a temperature of 200° to 350° C.

A coating material for a casting mold, made by dispersing a heat resistant short fiber, e.g. at least one selected from the group consisting of a potassium titanate ($K_2Ti_6O_{13}$) fiber, a polytitanocarboxylsilane fiber, a carbon fiber and a whisker into an aqueous dispersion resulting from addition of water in a water content of up to 20% by weight to the above-described composition, applying the resulting dispersion onto an inner surface of the mold and curing the applied coating in a manner described hereinafter exhibits very excellent wear and heat resistances, peel-off stability and durability, as well as a good releasability for a cast product when the mold is used. From the respect of disperseability, it is convenient that the heat resistant fiber used in this case is a short fiber capable of being dispersed in water, e.g. a short fiber having a length of 5 to 200 μm and a diameter of 0.05 to 5 μm.

The coating after being applied onto the inner surface of the mold is cleared of water at a temperature in a range of room temperature to 90° C. and then hardened by a curing reaction at a temperature of 200° to 350° C."

The base metal of the mold used in the present invention may be any of all usable metals such as copper, copper alloys, steels, aluminum, aluminum alloys, magnesium, magnesium alloys. Surprisingly, the composition of the present invention makes it possible to use even metals having lower melting points and easy to work, as are nonferrous metals such as, particularly, copper, copper alloys, aluminum, aluminum alloys, magnesium, magnesium alloys.

The potassium titanate of the heat resistant short fibers capable of being used in the present invention is described in "Researches for Systhesis of Potassium Titanate Fiber" in Research Report No.34, 1982, pages 1 to 37, of the Inorganic Material Research Institute by the Science and Technology Agency. The role of this fiber is to improve the heat and wear resistances and the releasability of the mold. This fiber may be a fine fiber having a length of 5 to 200 μm, preferably 10 to 50 μm and a diameter of 0.05 to 5 μm, preferably 0.1 to 1 μm. It is convenient that the amount of potassium titanate added to the aqueous dispersion of the heat resistant composition of the present invention is of 2 to 30% by weight.

The present invention also contemplates a sheet made by applying, to a heat resistant fabric to a dry coating thickness of 50 to 400 μm, preferably 200 to 250 μm, a dispersion of a heat resistant short fiber, e.g., at least one selected from the group consisting of a potassium titanate ($K_2Ti_6O_{13}$) fiber, a polytitanocarboxylsilane fiber, a carbon fiber, a ceramic fiber and another whisker dispersed into an aqueous dispersion resulting from addition of water in a water content of up to 20% by weight to the coating composition of the present invention, as well as a coating material for a casting mold, which comprises such a sheet affixed to an inner surface of the mold with an adhesive composition of the present invention.

The heat resistant fabric used in the present invention may be one to which the aqueous dispersion of the coating composition of the present invention can be satisfactorily applied. Such fabrics include non-woven, woven and knitted fabrics made of carbon, titano, alumina and silicon carbide fibers. Although the thickness of the fabric is particularly not limited, it is preferred that the thickness of the fabric is relatively thin as small as 10 to 1,000 μm in fields of use where a precision is required.

Further, the present invention is directed to a process for coating a casting mold, comprising the steps of: impregnating a heat resistant fabric of the type described above with a coating composition, if necessary, by adding water in amount of up to 20% by weight; applying or affixing the resulting fabric to an inner surface of the mold with a heat resistant adhesive of the present invention; removing water at a temperature in a range of room temperature to 90° C. ; and effecting a curing reaction at a temperature of 200° to 300° C. , as well as a coating material produced in this manner.

An embodiment of the present invention in which the composition thereof is utilized to a casting mold will be described below.

First, into a composition of the present invention containing water added thereto in a water content of up to 20% by weight, there is dispersed a short potassium titanate fiber in an amount of 2 to 15% by weight based on the composition. The resulting dispersion is applied onto a surface of the mold to be coated; dried at a temperature in a range of room temperature to 90° C. for 1 or more hours and then cured at a temperature of 200° to 350° C. The coated surface of the mold includes those of a sprue, a run off, a feeder head and a body of the mold.

The mold having a coating which is made in this manner and contains a potassium titanate fiber has a satisfactory heat resistance required for casting as well as an excellent wear resistance and a distinguished releasability in withdrawing a molded product from the mold after casting. Further, even if 10,000 shots of molding are conducted without application of a facing material, no abnormality is produced in the surface profile of a molded product and therefore, the mold has an excellent durability sufficiently fit for use.

Further, the present invention is directed to a heat resistant sheet made by applying a coating composition of the present invention onto a heat resistant fabric of the type described above to a dry film thickness of 50 to 400 μm after addition of a small amount of water if required.

Yet further, the present invention is directed to a heat resistant fiber-containing sheet made by pouring an aqueous dispersion containing a composition of the type described above together with at least one of the above-described heat resistant short fibers onto a peelable, water-permeable substrate, e.g., a wire net or the like, removing water at a temperature in a range of room temperature to 90° C. , and peeling off the resulting material. This sheet may be dried when it is to be used.

The thickness of such sheets is particularly not critical, but can be properly determined depending upon the applications. For example, when the sheet is to be affixed or applied to an inner surface of a casting mold, it is convenient that the thickness of the sheet is of about 50 to about 1,000 μm. However, in the case of an application where a dimensional stability is not required, the thickness may be, of course, of a further increased value.

Description will now be made of two preferred embodiments of the present invention in which a composition of the present invention is used in the production of a sheet.

First, into a dispersion of a composition of the present invention containing water added thereto in a water content of up to 20% by weight, there are dispersed 5 to 15% by weight of a short potassium titanate fiber and 5 to 15% by weight of another ceramic fiber, e.g., an alumina fiber based on the composition. The formed dispersion is poured in a proper amount onto a filter paper in a suction filter where most of water is removed by a suction filtration, and the resulting material is dried for 1 to 3 hours at a temperature in a range of room temperature to 90° C.

The thickness of a dry sheet produced by one run of pouring is up to about 500 μm. Further, in order to produce a thicker sheet, the above-described pouring and water-removing operations may be repeated and then, a curing reaction may be effected.

The second embodiment involves dispersing a short potassium titanate fiber and another ceramic fiber, e.g., an alumina fiber into water. Then, the formed dispersion is poured in a proper amount onto a filter paper of a suction filter where most of water is removed by a suction filtration to form a sheet-like material. A proper amount of an aqueous dispersion of the composition of the present invention is sprayed onto the sheet-like material. The resulting material is slightly dried at room temperature, followed by respraying of the same aqueous dispersion thereonto and drying for 1 to 3 hours at a temperature in a range of room temperature to 90° C. These sheets may be cured for about 1 to 3 hours at a temperature of 200° to 350° C., when they are to be used, for example, to be affixed or applied.

The produced sheet can be properly affixed to a member at a place in which a heat resistance at up to about 1,300° C.

The present invention will be described below in more detail by way of Examples.

EXAMPLES OF PRODUCTION OF COMPOSITION

Example 1

23 g Of sodium silicate containing 5 ml of water added thereto is added to 50 g of a powder mixture consisting of 60 parts by weight of zirconium oxide, 40 parts by weight of silica, 5 parts by weight of sodium aluminate and 4.8 parts by weight (corresponding to 8% by weight based on the zirconium oxide) of yttria, and they are then kneaded to form a viscous paste-like material.

Example 2

20 g Of sodium silicate containing 5 ml of water added thereto is added to 50 g of a powder mixture consisting of 50 parts by weight of zirconium oxide, 55 parts by weight of silica, 5 parts by weight of sodium aluminate and 2 parts by weight (corresponding to 4% by weight based on the zirconium oxide) of yttria, and they are then kneaded to form a viscous paste-like material,

Example 3

24 g Of sodium silicate containing 4 ml of water added thereto is added to 50 g of a powder mixture consisting of 40 parts by weight of zirconium oxide, 65 parts by weight of silica, 5 parts by weight of sodium aluminate and 2 parts by weight (corresponding to 5% by weight based on the zirconium oxide) of yttria, and they are then kneaded to form a viscous paste-like material.

Example 4

22 g Of sodium silicate containing 4 ml of water added thereto is added to 50 g of a powder mixture consisting of 30 parts by weight of zirconium oxide, 65 parts by weight of silica, 5 parts by weight of sodium aluminate and 1.5 parts by weight (corresponding to 5% by weight based on the zirconium oxide) of yttria, and they are then kneaded to form a viscous paste-like material.

EXAMPLES OF USE OF COMPOSITION

Example 5

10 g Of a potassium titanate fiber having an average length of 20 $\mu$m and an average diameter of 0.9 $\mu$m is dispersed into an aqueous dispersion of 50 g of the paste-like material described in Example 1 in 5 ml of water. The formed dispersion is applied onto a carbon fiber woven fabric having a thickness of 500 $\mu$m to a wet film thickness of 300 $\mu$m (dry film thickness: about 215 $\mu$m). The resulting material is dried at 90° C. for 1 hour and then cured at a curing temperature of 250° C. for 2 hours.

Then, using 50 g of the composition of Example 1, the above-described cured carbon fiber woven fabric is affixed to an inner surface and a sprue surface of a copper alloy mold for casting a casing for an automobile engine. The affixed fabric is likewise dried at 90° C. for 1 hour and then cured at a curing temperature of 250° C. for 2 hours.

When the mold made in this manner was used for casting a casing for an automobile engine while being cooled to 350° to 400° C. and even if 10,000 shots were conducted, there was still no change on the surface of the mold, and the surface profile of a molded product was good. The releasing was very easy.

Example 6

Using 50 g of the composition described in Example 2, a carbon fiber woven fabric having a thickness of 500 $\mu$m is affixed to an inner surface, a sprue surface and the like of a copper alloy mold for casting a casing for an automobile engine. The affixed fabric is dried at 90° C. for 1 hour and then cured at a curing temperature of 250° C. for 2 hours.

When the mold made in this manner was used for casting a casing for an automobile engine while being cooled to 350° to 400° C. and even if 10,000 shots were conducted, there was still no change on the surface of the mold, and the surface profile of a molded product was good. The releasing was very easy.

Example 7

6 g of potassium titanate fiber and 4 g of an alumina fiber each having an average length of 20 $\mu$m and an average diameter of 0.9 $\mu$m are dispersed into an aqueous dispersion of 50 g of the composition described in Example 2 in 4 ml of water.

The resulting dispersion is applied to an inner surface of a steel mold and dried at 90° C. for 1 hour and then cured for 2 hours to provide a coating film having a dry film thickness of about 230 $\mu$m.

When the mold made in this manner was used for casting a casing for an automobile engine and even if 10,000 shots were conducted, there was still no change on the surface of the mold, and the surface profile of a molded product was good. The releasing was very easy.

PRODUCTION OF SHEET

Example 8

6 g Of potassium titanate fiber and 4 g of an alumina fiber each having an average length of 20 $\mu$m and a diameter of 0.9 $\mu$m were dispersed into an aqueous dispersion resulting from addition of 5 ml of water to 50% of the dispersion of Example 3. A filter paper is laid on Nutsche having an inside diameter of 100 mm. The dispersion of Example 1 is sprayed onto the filter paper, and most of water is removed by a suction filtration to provide a sheet having a wet thickness of about 1 mm. The sheet is withdrawn together with the filter paper and then placed on an unused filter paper and air-dried at room temperature for 1 hour. The obtained sheet has a thickness of about 0.6 mm.

Example 9

50 g Of the dispersion of Example 1 is sprayed onto a woven fabric of a polytitanocarboxylsilane fiber to a wet film thickness of 300 um and dried at 90° C. for 1 hour to provide a sheet having a coating layer having a dry film thickness of 265 $\mu$m.

If the sheet is cured at 300° C., it has a resistance to a temperature of 1,300° C.

Example 10

6 g Of a potassium titanate fiber and 4 g of an alumina fiber each having an average length of 20 um and an average diameter of 0.9 um are added to a dispersion resulting from addition of 5 ml of water to 50 g of the dispersion of Example 4 and mixed together. The mixture is poured onto a wire net having a very fine mesh and dried 90° C. for 1 hour. Thereafter, the resulting coating film is peeled off from the wire net to provide a sheet.

EXAMPLES OF USE OF SHEET

Example 11

The sheet made in Example 8 is affixed or applied to an inner surface, an inner sprue surface and the like of a copper alloy mold for casting a casing for an automobile engine with 50 g of the dispersion described in Example 4 (this mold is a copper alloy mold of a construction which is described in detail in Japanese Patent Application No. 306824/88 and has three layers: an Ni-plating layer, a Co/Mo/Cr alloy coating layer as an intermediate layer and a porous $Al_2O_3/ZrO_3$ ceramic coating layer as an outer layer on an inner surface thereof, excepting that the above sheet is herein affixed or applied in place of the ceramic layer). The affixed sheet is dried at 90° C. for 1 hour and then cured at a temperature of 250° C. in a drying chamber.

When the mold made in this manner was used for casting a casing of an automobile engine while being cooled to 350° to 400° C. and even if 10,000 shots were conducted, there was still no change on the surface of the mold, and the surface profile of a molded product was good. The releasing was very easy.

INDUSTRIAL APPLICABILITY

The heat resistant composition of the present invention not only has excellent heat and wear resistances and releaseability and further exhibits an excellent durability, but also the hardened film thereof after curing exhibits a more excellent stability than the adhesive described in Japanese Patent Publication No.3349175. Accordingly, the heat resistant composition of the present invention significantly contributes to an industry as an adhesive and/or a coating in an industrial field in which the heat and wear resistances and the releaseability are required.

What is claimed is:

1. A process for coating a casting mold, comprising the steps of impregnating a heat resistant fabric with a coating agent composition comprising a powder mixture consisting of 20% by weight or more of zirconium oxide, 1 to 10% by weight of sodium aluminate, 2 to 15% by weight of yttria as based on the amount of zirconium oxide and the balance of silica; and sodium silicate containing a small amount of water added thereto sufficient to form a paste out of the powder mixture, the sodium silicate being in an amount of 40 to 50 parts by weight based on 100 parts by weight of the powder mixture), affixing the impregnated fabric to a surface of the mold, removing water at a temperature in a range of room temperature to 90° C., and effecting a curing reaction at a temperature of 200 to 350° C.

2. A process for producing a heat resistant fiber-containing sheet, comprising the steps of pouring, onto a peelable, water-permeable substrate, a dispersion of at least one heat resistant short fiber selected from the group consisting of a potassium titanate ($K_2Ti_6O_{13}$) fiber, a polytitanocarboxylsilane fiber, a carbon fiber, a ceramic fiber and another whisker dispersed into an aqueous dispersion resulting from addition of water into a coating agent composition comprising a powder mixture consisting of 20% by weight or more of zirconium oxide, 1 to 10% by weight of sodium aluminate, 2 to 15% by weight of yttria as based on the amount of zirconium oxide and the balance of silica; and sodium silicate containing a small amount of water added thereto, the sodium silicate being in an amount of 40 to 50 parts by weight based on 100 parts by weight of the powder mixture), to a water content of up to 20% by weight, removing water at a temperature in a range of room temperature to 90° C., and peeling off the resulting sheet from the substrate.

3. A heat resistant fiber-containing sheet produced in a process according to claim 2.

4. A method of use of an adhesive composition comprising a powder mixture consisting of 20% by weight or more of zirconium oxide, 1 to 10% by weight of sodium aluminate, 2 to 15% by weight of yttria as based on the amount of zirconium oxide and the balance of silica; and sodium silicate containing a small amount of water added thereto sufficient to form a paste out of the powder mixture, the sodium silicate being in an amount of 40 to 50 parts by weight based on 100 parts by weight of the powder mixture);

said method comprising applying said composition onto a substrate, and removing water at a temperature in a range of room temperature to 90° C. after coating said substrate on a mating member to be bonded when said composition is used as an adhesive composition, and effecting a curing reaction at a temperature of 200° to 350° C.

5. A method of use of a coating composition comprising: a powder mixture consisting of 20% by weight or more of zirconium oxide, 1 to 10% by weight of sodium aluminate, 2 to 15% by weight of yttria based on the amount of zirconium oxide and the balance of silica; and sodium silicate containing a small amount of water added thereto sufficient to form a paste out of the powder mixture, the sodium silicate being in an amount of 40 to 50 parts by weight based on 100 parts by weight of the powder mixture);

said method comprising applying said composition onto a substrate, and removing water at a temperature in a range of room temperature to 90° C. after coating said substrate on a mating member to be bonded when said composition is used as an adhesive composition, and effecting a curing reaction at a temperature of 200° to 350° C.

6. The method of claim 4 further comprised of the steps of applying the adhesive composition of claim 4 to the inner surface of a mold, and applying thereto a sheet having a dry film thickness of 50 to 400 μm, made by applying, onto a heat resistant fabric, a dispersion of at least one heat resistant short fiber selected from the group consisting of a potassium titanate ($K_2Ti_6O_{13}$) fiber, a polytitanocarboxylsilane fiber, a carbon fiber, a ceramic fiber and another whisker dispersed into an aqueous dispersion resulting from addition of water into a coating composition comprising: a powder mixture consisting of 20% by weight or more of zirconium oxide, 1 to 10% by weight of sodium aluminate, 2 to 15% by weight of yttria as based on the amount of zirconium oxide and the balance of silica; and sodium silicate containing a small amount of water added thereto, the sodium silicate being in an amount of 40 to 50 parts by weight based on 100 parts by weight of the powder mixture), the water content being up to 20% by weight, and removing water at a temperature in a range of room temperature to 90° C.

* * * * *

UNITED STATES PATENT AND TRADEMARK OFFICE
CERTIFICATE OF CORRECTION

PATENT NO. :   5,411,804
DATED      :   May 2, 1995
INVENTOR(S):   Nobuhiro Sugitani It is certified that error appears in the above-indentified patent and that said Letters Patent is hereby corrected as shown below:

On the title page,   Item [73]     Assignee's name
to read as follows:

Sugitanikinzokukogyo Co. Ltd.

Signed and Sealed this

Twenty-seventh Day of June, 1995

Attest:

BRUCE LEHMAN

*Attesting Officer*                *Commissioner of Patents and Trademarks*